S. W. TYLER.
Harvester.
No. 6,609. Reissued Aug. 24, 1875.
Fig. 1.
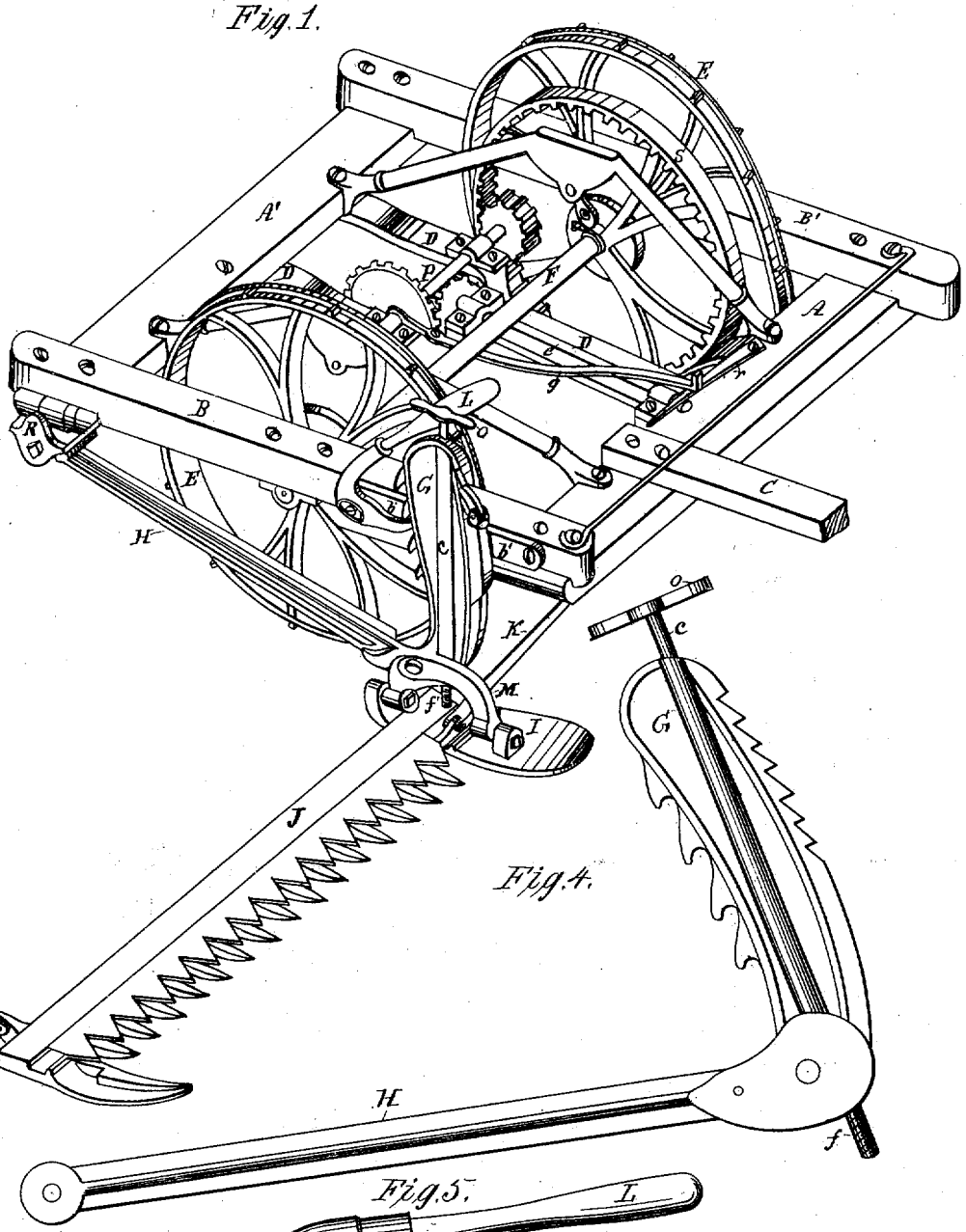
Fig. 4.
Fig. 5.
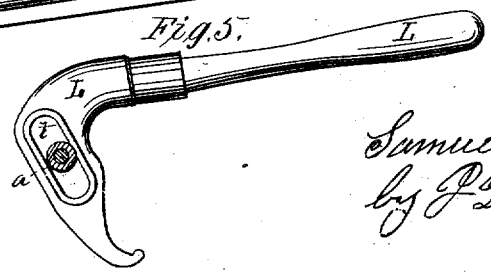
Witnesses,
P. E. Wilson
Alex Malon
Inventor
Samuel W. Tyler
by J. D. Green atty.
N. PETERS, PHOTO-LITHOGRAPHER, WASHINGTON, D. C.

S. W. TYLER.
Harvester.
No. 6,609. Reissued Aug. 24, 1875.
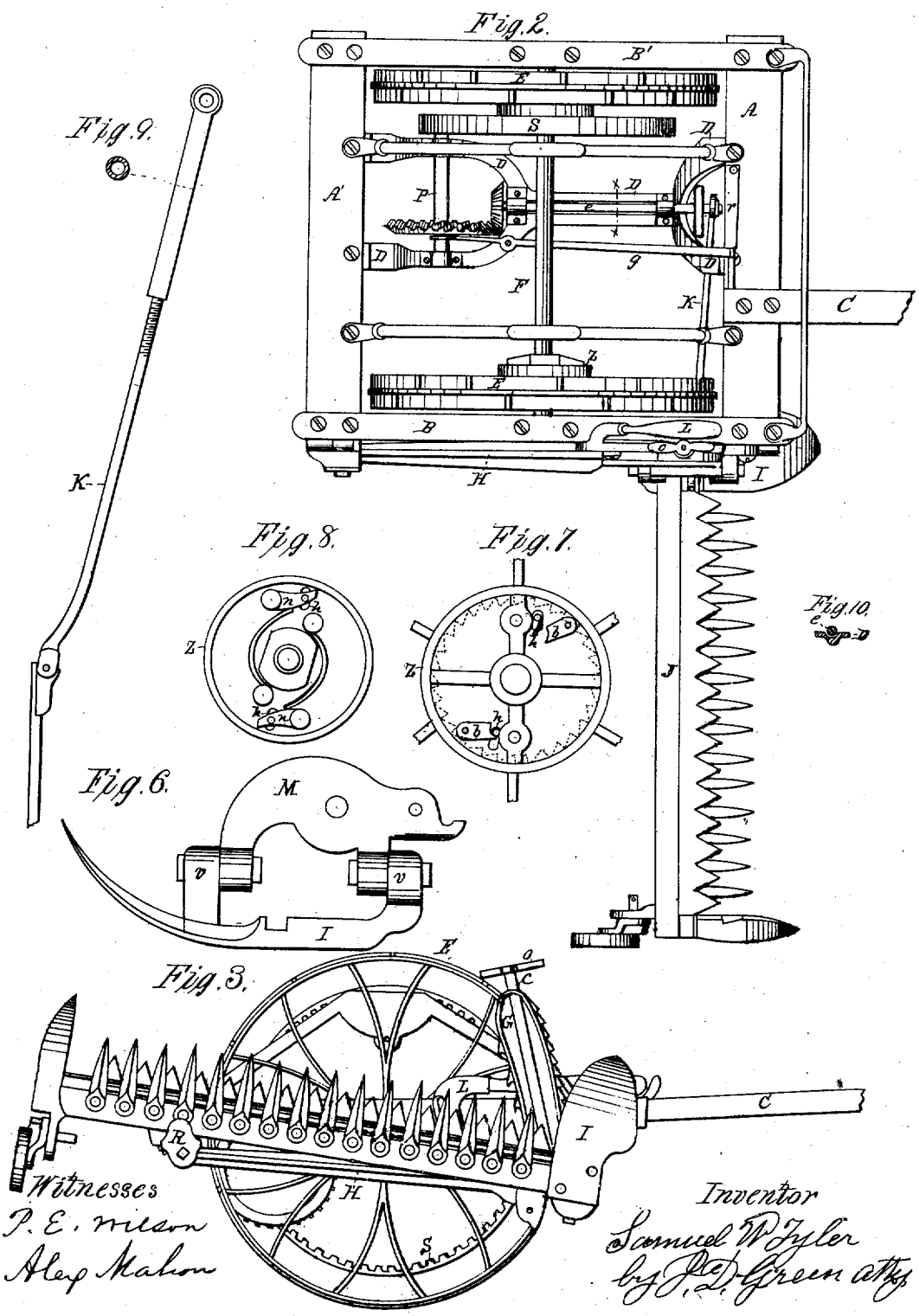
N. PETERS, PHOTO-LITHOGRAPHER, WASHINGTON, D. C.

UNITED STATES PATENT OFFICE.

SAMUEL W. TYLER, OF TROY, NEW YORK.

IMPROVEMENT IN HARVESTERS.

Specification forming part of Letters Patent No. 30,651, dated November 13, 1860; extended seven years; reissue No. 6,609, dated August 24, 1875; application filed February 20, 1875.

*To all whom it may concern:*

Be it known that I, SAMUEL W. TYLER, now a resident of the city of Troy, in the State of New York, have invented Improvements in Grain and Grass Harvesting Machines. The drawings herewith presented, with the figures and letters of reference thereon, form a part of this specification.

Like letters refer to like parts in all the drawings.

Figure 1 is a perspective view of a machine having my improvements therein. Fig. 2 is a top or plan view thereof. Fig. 3 is a side elevation thereof with the cutting apparatus folded back into its rest by the side of the machine. Fig. 4 is a view of the automatically-adjustable head-piece with a lateral brace attached thereto. Fig. 5 is a view of the slotted lever for raising the head-piece and cutting apparatus. Fig. 6 is a view of the shoe at the inner end of the finger-beam and a swivel or turn-piece, which are used in folding the cutting apparatus by the side of the machine and in automatically elevating the front edge of the cutting apparatus. Fig. 7 is a view of the exterior of a closed ratchet-box at the end of the hub of the driving-wheels. Fig. 8 is a sectional view of the inside of the inclosed ratchet and pawl box. Fig. 9 is a longitudinal view of a hollow or tubular pitman-rod with an adjustable connecting-joint. Fig. 10 is a cross-section of that portion of the frame D which shields and supports the shaft *e*, taken at *x x*, Fig. 2.

My invention relates to improvements in harvesters, as will be hereinafter more fully set forth.

That others skilled in the art may make and use my invention, I will state the manner of its construction and principles of its operation, to wit:

It has a frame composed of the cross-pieces A and A′, the side pieces B B′, and the rigid metallic support D, which support D is cast or formed in one piece, and constitutes an important part of my invention. It supports all of the actuating-gearing between the main gear or driving wheels and cutting apparatus, and is supported through the medium of the frame A A′, entirely upon the axle of the driving-wheels, and has an articulating or tilting action independent of the up and down articulating action which is imparted to the cutting apparatus by following the unevenness of the ground when at work, or when it is raised or lowered by the operator. This support is carried by the driving-wheels E E, and its tilting action is controlled by a draft-pole, C. The drawing-wheels are placed on their axle just inside of the side pieces B B′, the metallic support D being brought into position between the driving-wheels. A gear-wheel, *s*, is firmly secured to the axle F, and in its revolutions with the axle it revolves a pinion on the transverse pinion-shaft P, that on its other end carries a bevel-wheel, that in its revolutions revolves a bevel-pinion on the crank or pitman shaft, which, by a wrist placed eccentrically on a disk at its opposite end, vibrates the pitman or connecting rod K, and with it the cutting-sickle.

In my experience with harvesting-machines with wooden frames I have found that the gears and their shaft-journals were liable to become cramped and bound in their action by springing, warping, or wringing of the frame, and when the frame becomes so twisted or warped as to but slightly bind these parts, the action of the cutting apparatus is thereby rendered much less effective, which I have found to be an evil of such magnitude as to be studiously avoided.

To prevent such evils I have provided that all of the gearing and shafts which communicate motion from the main gear-wheels or driving-wheels and axle thereof to the cutter, shall be borne on a rigid common support or frame, cast or formed in one piece, which, in my machine, consists of a cast-iron support, D, formed in one piece, and which is not subject to warping or being strained out of place by use, and hence the several bearings of the shafts and gears, intermediate or between the drivers and the cutters, are kept in their proper relative position without danger of becoming cramped or bound in their action.

That portion of the support D between the pinion and pitman crank, which are on the shaft *e*, is hollowed out to receive said shaft, or is made concave on one side and convex on the other, and having a horizontal projection on each side of said concavity. This affords great strength to the frame with but a small amount of material, and also affords an effectual shield, to prevent the grass or grain from underneath winding around said shaft and clogging it; also protecting said shafts from dirt or other obstructing matter from underneath, so as not to bind or retard the action of the gears and cutting-sickle.

I have also provided an improved head-piece, G, which is automatically and vertically adjustable at the point of its attachment to the machine, and a rigid arm, H, which extends backward from the head-piece G and is hinged to the rear corner of the frame of said machine. The head-piece G is secured to the frame of said machine by an iron plate, *b'*, bolted to said frame. This plate *b'* has a projection upon its face in which there is a groove, into which the front edge of said head-piece G is fitted, so that it may move up and down therein and which prevents an undue side motion of said head-piece. The rigid arm H is firmly hinged to the rear corner of the frame of the machine, and prevents an undue fore-and-aft motion thereof, and serves to give additional power of resistance to the head-piece in resisting unequal strains, and is a lateral brace to the finger-bar. The head-piece G rises and falls automatically according to the undulations of the ground in the path of the machine, and the part of the rigid arm adjoining the head-piece participates in the upward and downward motion of the head-piece, serving at the same time as a lateral brace thereto.

The cutting apparatus is attached to the head-piece and to the pitman-rod by flexible joints, which will permit either the outer or inner end thereof to rise or fall to any required point, so that it may adjust itself to any or all of the undulations of the ground independently of the action of the frame on which the intermediate shafts and gear-wheels are mounted. The swivel or turn piece M is attached to the shoe I by the hinge-joints *v v*, and does not bear upon said shoe in any other way, so that the outer or inner end of the finger-bar may turn up or down to any required point. Said piece M is secured to the head-piece G by a strong bolt, as represented in Fig. 1, and is permitted a free oscillation downward and upward in front on said bolt, so that the front edge of the cutting apparatus will turn up or down, and adjust itself so as to glide over any obstructions in its path. A stop on the rear end of the swivel or turn piece M comes under a flange or rib on the rigid arm H of the head-piece, and prevents the front edge of the finger-bar from being turned down too far or below a line of profitable employment. By reference to Figs. 4 and 6 it will be seen that holes are provided other than those used in fastening together the head and turn pieces, the object of which is to regulate the degree of up or down or oscillating action of the turn-piece M, and with it the cutting apparatus, by the insertion of a stay-pin through said holes. The hole in the turn-piece M should be in the form of a slot, so as at all times to admit of a moderate amount of oscillation. The finger-bar J is firmly attached to the shoe I, and the latter is pivoted to the turn-piece M by hinge-joints *v*, as shown in the drawings, and by means of these joints and the joints at the inner end of the finger-bar, also the swivel or turn joint in the pitman-rod K, the cutting apparatus may be turned up, or up and back by the side of the machine, and rest on or into the support R (as shown in Fig. 3 of the drawings) when traveling.

Occasions often occur in the use of harvesting-machines when it becomes necessary to raise the cutting apparatus to avoid obstructions in its path; and as the cutting apparatus is attached to the frame and actuating portions of the machine by flexible joints, which will permit either the outer or inner end of the finger-bar to rise or fall to any required position to meet the unevenness of the ground, and still work successfully, I regulate the falling action of the outer end of said finger-bar by an adjusting stop-rod, *c*, with convenient handle *o* at its top. This rod *c* extends down through the head-piece G, and has a fixed nut near its lower end, and in said head-piece the lower end of said rod *c* has a screw-thread, *f*, to fit said nut; and when said rod is turned down it impinges upon the inner end of the finger-bar J, which will raise the outer end of said finger-bar to any desired point. When it is desired or necessary to raise the whole cutting apparatus, to pass over any obstructions in the path of the machine, I turn down the stop-rod *c* until the outer end of the finger-bar J is brought to the required height from the ground. I then use the following device, viz: The rear edge of the head-piece G is provided with ratchet-teeth of such peculiar form (as shown in the drawings) that when the bite of the lever L, which is moved on a fulcrum-pin covered with a friction-roller, *a*, attached to the side piece B, is operated in connection with said teeth, they together form a connection by which the bite of the lever L is held in proper position, with a tenacity to compel such a working of said lever upon the friction-roller *a* in the slot *t* as will lengthen or shorten the short part or end of said lever according to the different positions which it occupies in producing an upward and downward movement of the head-piece G and the cutting apparatus. The angular position of the handle of the lever L in relation to its slot *t* is so arranged that by the forward and downward inclination of the handle the bite of the lever will readily drop into its proper connection with the ratchet-teeth upon the head-piece G. These features are important inasmuch as they allow a free and independent movement of the head-piece when the machine is in use, while the lever remains at rest, and yet by its use the operator is enabled to instantly raise the cutting apparatus as emergency may require.

A ratchet of ordinary form is provided on the front edge of the head-piece G, and a pawl is hinged at a convenient position in front of it to hold it and the cutting apparatus in any position desired when at work or traveling.

I have constructed my sickle-bar as light as possible with a due regard to strength, and have constructed my pitman-rod hollow or tubular and in two parts, and with an adjustable and swivel joint to connect the parts, whereby it is made lighter by a large proportion without impairing its strength, and it will turn in said connecting-joint sufficiently to admit of the cutting apparatus being turned up and back by the side of the machine, as shown in Fig. 3.

I have found by experience that ratchets and pawls, (by which to hold the axle and driving-wheels so as to revolve together when desired,) when uncovered, were liable to become obstructed or clogged in their action. I have constructed mine on the hub of the driving-wheels. The pawls are kept in position by springs, as shown in Fig. 8. The pawls, ratchets, and springs are thoroughly protected from obstructing matter, the whole being completely inclosed in a box by covering collars or slides *z*, which are securely fastened to the axle. The pawls *n* are each provided with a pin that passes through the slots *h*, Figs. 7 and 8, in the side pieces or covering-collars *z*, by which to throw the pawls *n* out of clutch with the ratchets, where they may be held by the cams or buttons *b b* on the outside of the covering-collars *z*. (See Fig. 7.) When these pins are so held by the cams or buttons *b b*, the driving-wheels will revolve on the axle without giving or communicating motion to the gearing; therefore, when it is desired, or when an emergency may require it, the vibrating action of the cutters may be suspended in either of two ways—by moving with a lever one of the intermediate gear-wheels so as to disengage it from the others, when a portion of the gearing will continue to rotate with the driving-wheels, while the cutters and a portion of the gear-wheels will remain at rest; or all the gear-wheels may be stopped from their rotating action by disengaging the pawls from the ratchets, when all of the gear-wheels and cutting-sickle will be at rest.

A lever, *g*, is pivoted to the iron support D, which holds the gear on the shaft P in position to actuate the cutters, and is held in such position by a spring-catch, *r*, at its forward end on the cross-piece A, at a convenient distance from the feet of the operator, to enable him, by a slight pressure of the foot, to depress the spring-catch, thereby disconnecting the gears which communicate motion to the cutters from the driving-wheels. C is a draft-pole, rigidly attached to the frame of the machine, by which said machine is drawn, and by which the tilting action of the frame and intermediate actuating shafts and gears is controlled.

Supports for a driver's seat are shown in the drawings, a particular description of which, as well as a further and particular description of the cutting apparatus, (which is also shown in the drawings,) is not deemed important.

The apparatus used to regulate and adjust the cutting apparatus in my machine may be so modified or changed as to be attached to any desirable point or part of the machine without departing from the principle of my invention.

Among the new and useful results of my invention, as set forth in this specification, are simplicity, compactness, cheapness of construction, easy draft, great durability, the whole constituting a most efficient machine.

I claim—

1. The combination of the automatically-adjustable head-piece G, swivel or turn piece M, with the cutting apparatus, substantially as and for the purpose set forth.

2. The combination of the swivel-piece M, the shoe I, the flexible joints *v v*, and the head-piece G, so that the shoe and front part of the cutter-bar may have an automatic tilting action independently of the up-and-down movement of said head-piece, substantially as specified.

3. In a two-wheel harvesting-machine, having an axle connecting the wheels, a support for the driving mechanism of the cutters, made in one piece, the weight of which and that of the driving mechanism of the cutters being arranged between the main wheels, and sustained by the axle thereof, substantially as described, and for the purpose set forth.

4. The piece D, which supports the intermediate shafts and gear-wheels, constructed substantially as described, to form a shield from the under side to the crank-shaft *e*, substantially as specified.

5. The slotted lever L, movable on its fulcrum-pin, in combination with the head-piece G and cutting apparatus, as and for the purposes set forth.

6. The adjustable rod or stop *c*, head-piece G, and swivel-piece M, in combination with a cutting apparatus that is flexible at its inner end and is automatically adjustable, substantially as described.

7. The inclosed ratchet springs and pawls, arranged on the axle of the driving-wheel, in combination with the cams *b*, substantially as described, and for the purpose set forth.

S. W. TYLER.

Witnesses:
URIAH MALLERY,
J. D. GREEN.